H. DRUSCHEL.
COMBINED FRICTION AND POSITIVE CLUTCH.
APPLICATION FILED AUG. 6, 1912.

1,078,840.

Patented Nov. 18, 1913.

2 SHEETS—SHEET 1.

Witnesses
H. Strauss
R. H. Krenkel

Inventor
Henry Druschel
By Joshua R. H. Potts
Attorney

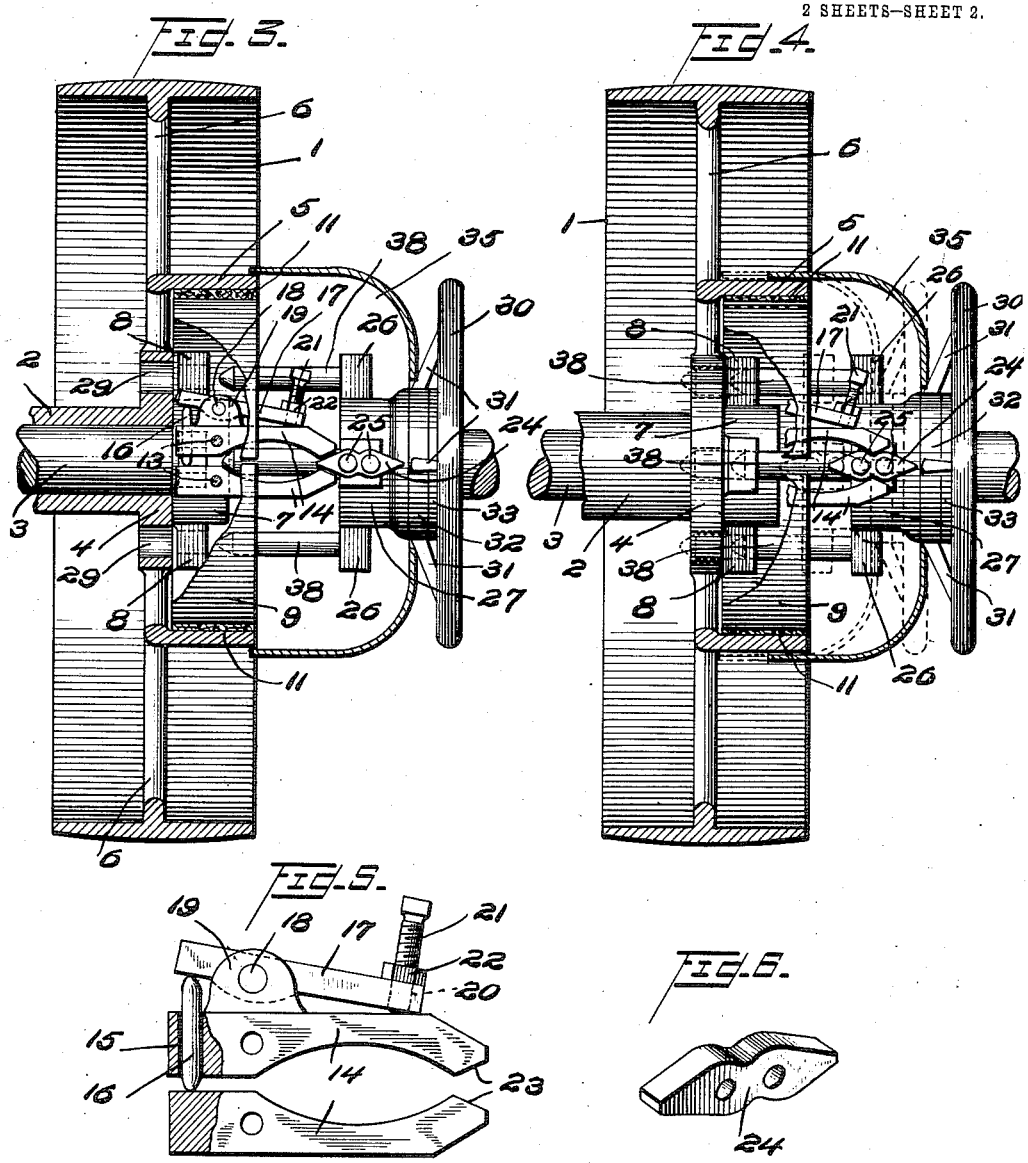

UNITED STATES PATENT OFFICE.

HENRY DRUSCHEL, OF COLUMBIA, PENNSYLVANIA.

COMBINED FRICTION AND POSITIVE CLUTCH.

1,078,840. Specification of Letters Patent. Patented Nov. 18, 1913.

Application filed August 6, 1912. Serial No. 713,521.

*To all whom it may concern:*

Be it known that I, HENRY DRUSCHEL, a subject of the Emperor of Germany, residing at Columbia, in the county of Lancaster and State of Pennsylvania, have invented certain new and useful Improvements in Combined Friction and Positive Clutches, of which the following is a specification.

My invention relates to improvements in combined friction and positive clutches, the object of the invention being to provide a clutch which is adapted when operated to first frictionally lock and then positively lock.

A further object is to provide a clutch of this character which is especially adapted for use in connection with a pulley allowing the pulley to be first frictionally locked and then positively locked through the medium of the same clutch controlling means.

With these and other objects in view, the invention consists in certain novel features of construction and combinations and arrangements of parts as will be more fully hereinafter described and pointed out in the claims.

Figure 1:
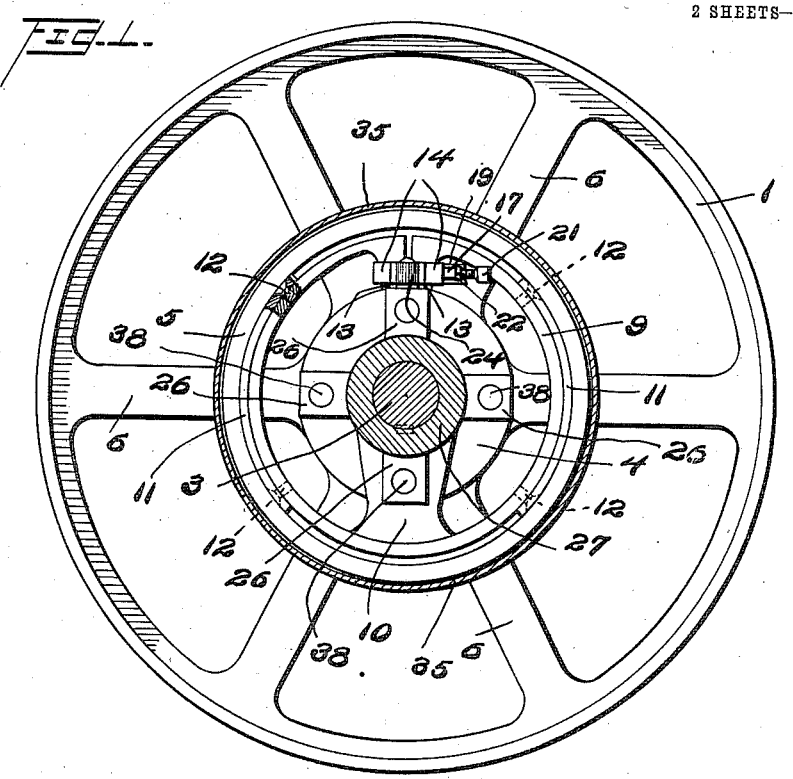
Figure 2:
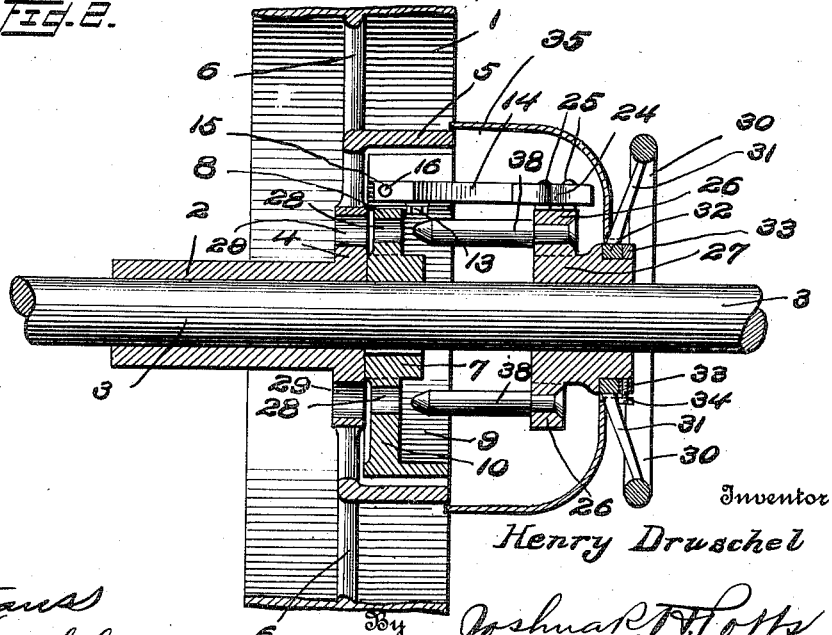

In the accompanying drawings: Figure 1 is a view in front elevation of the pulley provided with my improved clutch mechanism showing a portion of the clutch in section on the line 1—1 of Fig. 2. Fig. 2 is a view in longitudinal section showing a fragmentary section of the pulley. Fig. 3 is a view in longitudinal section partly in elevation and taken at right angles to Fig. 2 showing the clutch in inoperative position. Fig. 4 is a similar view showing parts broken away illustrating in full lines the clutch frictionally locked and in dotted lines positively locked. Fig. 5 is a view partly in elevation and partly in section illustrating the friction band adjusting mechanism, and Fig. 6 is a perspective view of the clutch operating double wedge.

1 represents a pulley having a hub 2 mounted to turn freely upon a shaft 3. This hub 2 is made with an integral flange 4, and a concentric ring 5 is formed integral with the spokes 6 of the pulley and is of a width approximately half the width of the pulley, said ring 5 being located on one side of the spokes only and constituting the fixed member of my improved friction clutch as will be hereinafter explained.

A collar 7 is keyed to shaft 3, and is located against the end of hub 2. This collar 7 is formed with three integral radial lugs and an integral web 10 spaced ninety degrees apart, and a split ring 9 is connected to the integral web 10. The web 10 is located midway between the ends of the split ring 9 and this ring 9 is located inside of ring 5.

Friction segments 11, preferably of fiber, are secured by screws 12 to the outer face of split ring 9, and when said split ring is expanded, said frictioned segments engage the inner face of ring 5 and firmly lock the parts together. The ends of the split ring 9 are connected by bolts 13 with levers 14 as shown in detail in Fig. 5.

It will be noted that the levers 14 are connected between their ends by the bolts 13 to the ends of the split ring 9 and that said bolts are located nearer one end of the lever than the other, dividing the same into longer and shorter arms at opposite sides of the bolt. One of the shorter arms of one of the levers is provided with a transverse opening 15 in which a pin 16 is located. One end of this pin bears against the other lever 14, while the other end of the pin is positioned against an adjusting lever 17. Lever 17 is fulcrumed between its ends on a pin 18 secured in a bracket 19 on a lever 14. The opposite end of this lever 17 is provided with a screw-threaded opening 20 to receive an adjusting screw 21 bearing against the lever 14. A jam nut 22 is provided on screw 21 so that the parts may be locked at any position of adjustment.

The long ends of the levers 14 are beveled as shown at 23 constituting a flaring entrance for a double wedge 24. This double wedge 24 is secured by two pins 25 to a lug 26 integral with a sliding sleeve 27 mounted upon shaft 3. The sleeve 27 is provided with four lugs 26 located ninety degrees apart and to each lug a locking pin 38 is securely riveted. These pins are located parallel with the shaft 3, and are positioned in alinement with openings 28 in the lugs 8 and web 10 on collar 7, and are adapted when the collar is moved to the proper position to be projected through the said openings 28 and also through openings 29 in flange 4 to positively lock the collar 7 and the pulley together.

A hand wheel 30 is connected by spokes 31 with a ring 32 mounted loosely on the reduced outer diameter of sleeve 27. A ring 33 is secured on the extreme end of this sleeve 27 by means of a screw 34 to secure the parts together. A circular shield 35 is secured to the ring 33 and is of a diameter sufficiently large to inclose ring 5. This shield prevents any possibility of the belt on the pulley engaging the clutch mechanism if the belt slips from the pulley. In other words, should the belt fall from the pulley on the clutch side thereof, it will engage the shield 35 and in nowise injure the clutch.

The double wedge 24 which is shown in perspective in Fig. 6, is pointed at both ends, gradually increases in thickness to points removed from the center and at the center again reduces in diameter, the purpose of which will now appear.

Fig. 3 shows the clutch in inoperative position. When the sleeve 27 is moved longitudinally of shaft 3 toward pulley 1 by means of hand wheel 30, the wedge 24 will move between the levers 14 and spread the levers apart. This movement of the levers will cause the split ring 9 to expand and the friction segments 11 will firmly engage the inner face of ring 5 and frictionally lock the parts together. This frictionally engaged position is shown in Fig. 4 where it will be noted that the ends of the arms 14 lie in the central reduced portion of the double wedge which serves to prevent accidental movement. This reduced intermediate portion, while slightly less in thickness than the greatest width of the wedge, is not sufficient to release the clutch, but only sufficient to hold the parts against accidental movement. A continued inward movement of the sleeve 27 causes the locking pins 38 to move through the openings 28 and 29 and positively lock collar 7 and the hub 2. At the same time this movement of the wedge permits the arms 14 to move and allow the split ring 9 to contract, the double wedge moving into position between the arms 14, the latter being cut out for the purpose as seen most clearly in Fig. 5. It will thus be seen that when the hand wheel 30 is moved in one direction a short distance, it will serve to expand the split ring and apply the friction clutch, and when moved a greater distance in the same direction, will positively lock and release the friction clutch. The friction clutch is released as the positive clutch is thrown into operation, so that the openings 28 and 29 may be brought into register to receive the pins 38, which latter securely lock the parts together. The extreme ends of the pins 38 are pointed, so that they readily find the openings 29 which are preferably slightly larger than the openings 28 as shown.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. In a clutch of the character described, the combination with a shaft, a pulley mounted to turn loosely on the shaft, and having openings therein, a fixed ring on the pulley concentric with the shaft, a collar keyed to the shaft, perforated lugs on the collar, an integral web on the collar, a split ring fixed to the web and located within the first-mentioned ring, levers pivoted between their ends to the ends of said split ring, a member movable longitudinally on the shaft, means on said member adapted to spread the free ends of the levers apart, and expand the split ring when said movable member is moved toward the pulley, and pins on said movable member adapted to be projected through the perforated lugs and into the openings in the pulley, substantially as described.

2. In a clutch of the character described, the combination with a shaft, a pulley mounted to turn loosely on the shaft and having openings therein, a fixed ring on the pulley concentric with the shaft, a collar keyed to the shaft, perforated lugs on the collar, an integral web on the collar, a split ring fixed to the web and located within the first-mentioned ring, levers pivoted between their ends to the ends of said split ring, a member movable longitudinally on the shaft, and a double wedge fixed to said member and movable between the free ends of the levers, whereby the split ring is expanded into frictional engagement with the first-mentioned ring, and pins on said movable member projected through the perforated lugs and into the openings in the pulley when said movable member is moved toward the pulley, substantially as described.

3. A clutch of the character described, comprising a rotary member having a circular series of openings therein, a collar having a circular series of openings therein, a longitudinally movable sleeve, pins carried by the sleeve and adapted to be projected through both of said series of openings to positively lock the rotary member and the collar together, a ring on the rotary member, a split ring inside of the ring on the rotary member, frictioned segments on the outer face of the split ring, levers connected to the ends of the split ring, and a double wedge fixed to the sleeve and adapted to move between the levers to expand the split sleeve and permit the same to contract, substantially as described.

4. A clutch of the character described, comprising a rotary member having a circular series of openings therein, a collar having a circular series of openings therein, a longitudinally movable sleeve, pins carried by the sleeve and adapted to be projected through both of said series of openings to positively lock the rotary member and the collar together, a ring on the rotary member, a split ring inside of the ring on the rotary member, frictioned segments on the outer face of the split ring, levers connected to the ends of the split ring, and a double wedge fixed to the sleeve and adapted to move between the levers to expand the split ring and permit the same to contract, said double wedge having pointed ends, and a restricted intermediate portion, and the levers having cut out portions receiving the double wedge when the pins are projected through both series of openings, substantially as described.

In testimony whereof I have signed my name to this specification in the presence of two subscribing witnesses.

HENRY DRUSCHEL.

Witnesses:
C. R. ZIEGLER,
S. W. FOSTER.